April 11, 1972 S. BEREDAY Re. 27,336

UPHOLSTERY CUSHION CONSTRUCTION COMPRISING A RESILIENT PADDING

Original Filed Jan. 21, 1965 2 Sheets-Sheet 1

INVENTOR
SIGMUND BEREDAY
BY
Curtis, Morris & Safford
ATTORNEYS

UPHOLSTERY CUSHION CONSTRUCTION COMPRISING A RESILIENT PADDING

Original Filed Jan. 21, 1965 2 Sheets-Sheet 2

INVENTOR
SIGMUND BEREDAY
BY
Curtis, Morris & Safford
ATTORNEYS

United States Patent Office

Re. 27,336
Reissued Apr. 11, 1972

27,336

UPHOLSTERY CUSHION CONSTRUCTION COMPRISING A RESILIENT PADDING

Sigmund Bereday, 11 Suchville, Bayamon, Puerto Rico

Original No. 3,266,066, dated Aug. 16, 1966, Ser. No. 427,059, Jan. 21, 1965. Application for reissue June 15, 1970, Ser. No. 46,130
Int. Cl. A47c *27/22, 27/14;* B60n *1/06*
U.S. Cl. 5—361 3 Claims

Matter enclosed in heavy brackets [ ] appears in the original patent but forms no part of this reissue specification; matter printed in italics indicates the additions made by reissue.

This invention relates to upholstered furniture and more particularly to a novel upholstered seat element and a novel method for forming same.

It has been a problem with furniture cushioning having a resilient padding and protective or decorative cover thereover such as those formed of textile and plastic materials that the recovery of the deformed padding has been slow or incomplete because of adherence and friction between the cover and padding in the deformed area. The cover has the surface friction effect of externally reinforcing the deformity in the padding so as to materially hinder recovery to its original shape. The adherence of the padding to the cover is caused by a number of factors releated to the surface properties of both adding and cover. However, attempts to use substitute materials for the padding and cover improve the deformation characteristics only at the cost of comfort and/or wearing characteristics of the cushion. To the extent that "crisp" looking furniture has been available, it has been relatively hard. Soft upholstered elements have not heretofore retained their shape.

Another problem arising from the adherence of the padding to the cover is the difficulty of assembling the upholstery cover over the padding.

Thus, furniture manufacturers have searched for a method to avoid this loss of shape in their products, not only because of the unattractive nature of the prolonged deformation, but also because the stresses caused thereby in the furniture components shorten the attractive and useful life of the furniture. Furthermore, furniture manufacturers have desired an easier method of assembling padding and cover than has heretofore been possible.

Therefore, it is an object of the instant invention to provide upholstered seat elements, such as cushions, backs seats, and arms, having excellent deformation, henceforth called "rebound," characteristics without consequent loss of comfort, wear and shape characteristics.

It is a further object of the invention to provide a simplified method for making upholstered structures.

It is another object of the invention to provide a unique seat, back and arm construction utilizing the unique seat element mentioned above and described below.

Applicants have substantially obtained these objects by providing a slippery interlayer between the padding of the upholstered elements and the upholstery cover thereof.

The many objects and advantages of the present invention can best be understood and appreciated by reference to the accompanying drawings which show seat and back cushions incorporating a preferred embodiment of the invention and wherein.

Figure 1:
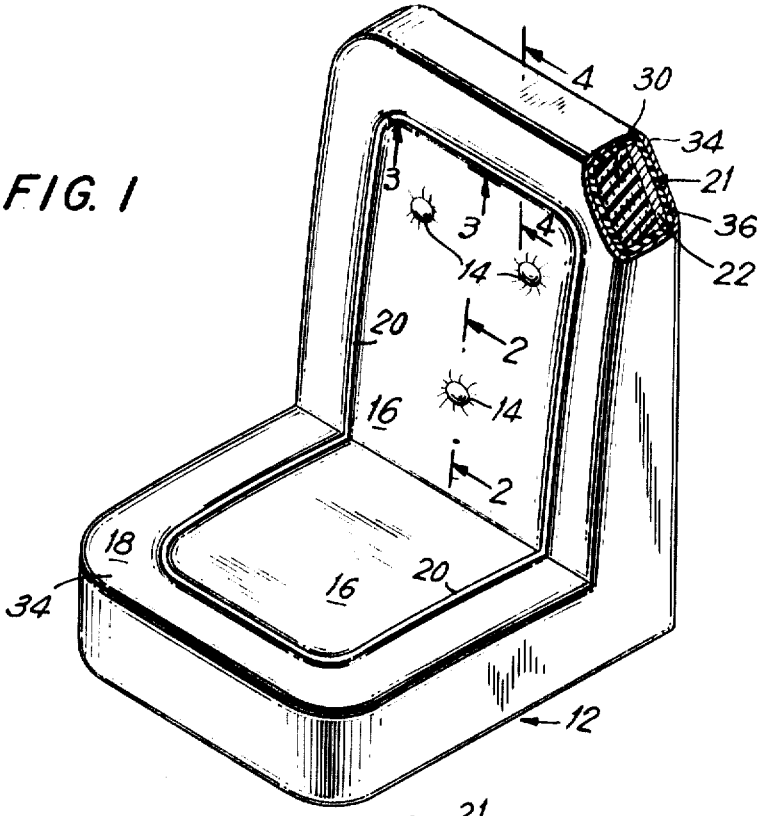
FIGURE 1 is a perspective view of a novel chair seat and back, partially broken away to show the interior construction of the back cushion.

It is seen that seat 12 has decorative tufting buttons 14 positioned against the surface 16 of an upholstery cover which may be made of leather, plastic, fabric or other conventionally used material. Surface 16 is depressed somewhat below the peripheral surface 18 to make the seat more comfortable and also to enhance its appearance. Ribbing 20 is held snugly against the seat and tends to demark a boundary between surfaces 16 and 18.

Figure 2:
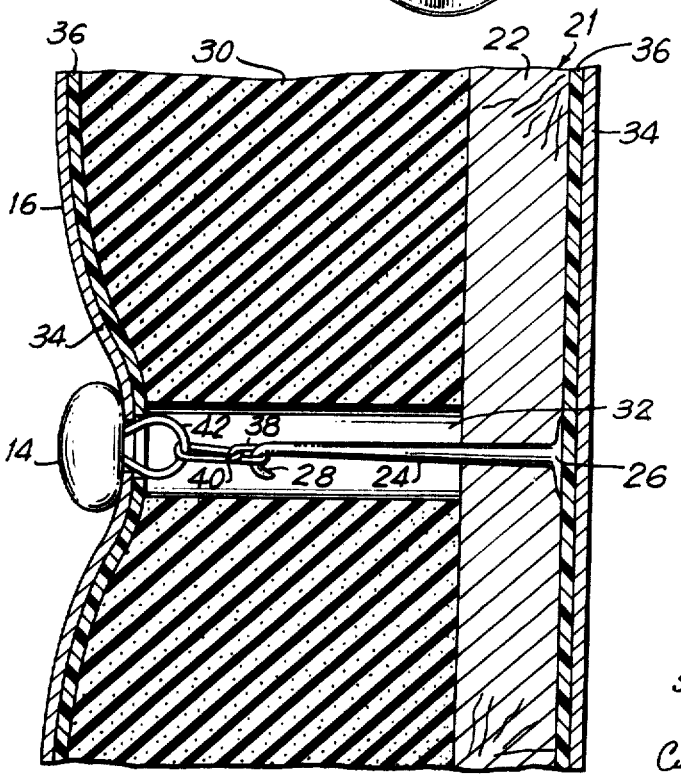
FIGURE 2 is a section taken on line 2—2 of FIGURE 1 showing the manner in which the decorative anchoring elements of the chair of FIGURE 1 are held in place.

FIGURE 2 is a section taken on the line 2—2 of FIGURE 1 showing the unique construction whereby buttons 14 are advantageously held in place.

The seat frame 21 includes board 22 into which a nail 24 is driven until nail head 26 is substantially flush with board 22, after which the nail ends are bent to form hooks 28. The foam pad 30, which may be polyurethane foam, is positioned over the nail-studded frame. Holes 32 are cut in foam 30 to make the nails 24 accessible.

The seat is assembled by attaching the foam pad 30 to board 22. Upholstery cover 34, which may be made of leather plastic, textile or other conventional upholstery covering material, is prepared by making an open-ended envelope of the covering material which is sewn on the inside seams and left in an inverted, i.e., inside-out, position. A plastic, e.g., polyethylene, interlayer 36 is placed over the foam by slipping a plastic bag over the foam, and then the envelope of upholstery cover 34 is slipped over interlayer 36. Ordinarily, such a method of cushion assembly would be impractical because of the surface friction between, and adherance of, foam 30 and the upholstery cover. Thus, it was previously necessary to first place an unfinished envelope over the upholstery cover 34, for example to leave the back side of the back rest cover off, and to fasten it by means of a separate sewing operation.

After covering 34 and slippery interlayer 36 have been positioned over frame 21 and foam 30, buttons 14 are affixed to nail hooks 21 through a relatively small aperture in covering 34 by means of an eye 38 attached by a string 40 to button eye 42.

Figure 3:
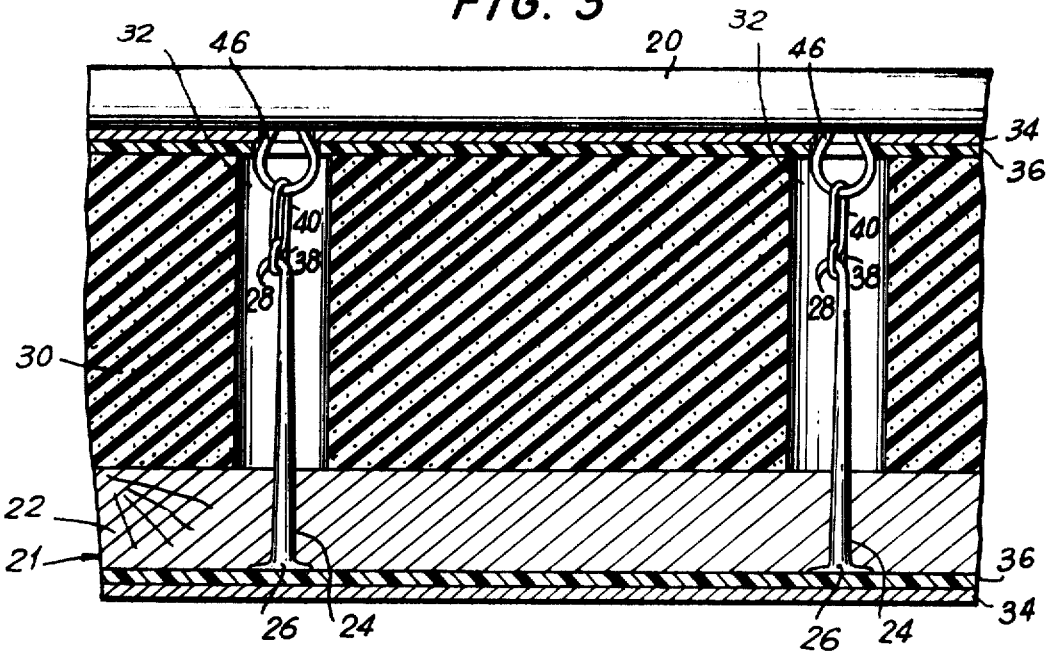
FIGURE 3 is a section at the line 3—3 of FIGURE 1 showing the attachment of a ribbing or welt to the cushion frame to produce a decorative recess in the upholstery cover.
Figure 4:
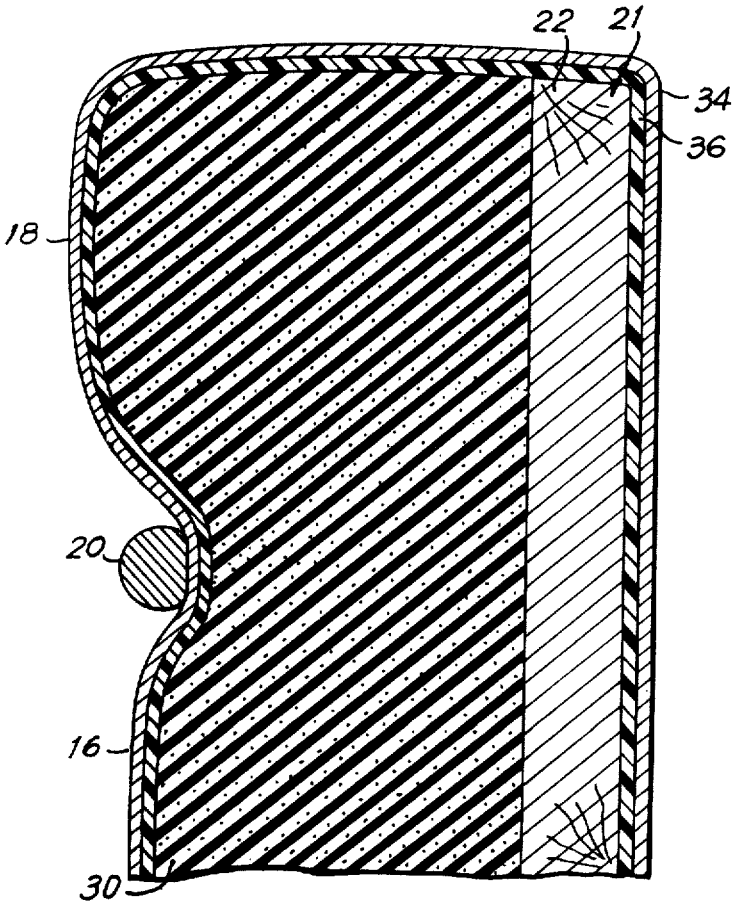
FIGURE 4 is a section taken on the line 3—3 of FIGURE 1 and showing the recessed or three-dimensional effect produced by the welting feature of the invention.

It will be noted in FIGURE 1 and, perhaps more clearly in FIGURE 4, that surface 16 is lower than surface 18. This result is brought about not by using different thicknesses of foam, but by utilizing ribbing 20 and the unique fastening system shown in FIGURE 3 to compress foam 30 along the perimeter defined by ribbing 20.

Thus, frame board 22 is placed on the opposite side of foam 30 from which it is desired to place ribbing. Nails 24 are driven into board 22 and the ends of the nails are bent to form hooks as described above. However, instead of putting an individual decorative button on each hook as shown in FIGURE 2, each hook is attached, by a string 40, to separate rib eyes 46. This attachment is made while depressing foam 30 down further than was done when attaching buttons 14 shown in FIGURE 2. The foam is held in depressed position by the ribbing and forms a bucket-type of seat.

Fastening of the anchoring members is accomplished with relative ease compared with the fastening of anchoring members by prior methods. The foam 30 is depressed until hook 38 comes into view. Then string 40 is easily attached to hook 28. The foam is then allowed to rebound to the limit allowed by the button which is now firmly attached to the frame. Replacement of worn or broken anchoring members may be carried out similarly. Anchoring members have heretofore been tied at the opposite side of the padding from that on which the anchoring members are placed. Thus when one of the members so affixed required replacement, obtaining access to the back of the padding was necessary and thus the complexity of the replacement operation was greater. Furthermore, to provide this access, the method of manufacturing was limited. For example, the structure shown in the drawings which is manufactured with particular economic advantage could not be so manufactured were any of the various old-fashion anchoring techniques used.

Slippery interlayer 36 is advantageously a thin film of plastic, e.g., polyethylene, of the type conventionally known to the art as "slip-grade" film, and may be, for example, 0.001 inch thick. This film not only improves the rebound qualities of the cushioning by reducing the attraction between the foam and covering, but has also been found to contribute materially to the ease with which the covering may be placed over the foam padding during assembly of the chair.

The plastic interlayer may be attached over the foam padding by any means and in any form. It is advantageous to form the interlayer into bags and slip it over the foam, or to wrap the foam with a sheet of the interlayer material. Furthermore, the interlayer may be coated on the inside of the upholstery cover or be coated on the surface of the foam cushion. Application of a slip-producing interlayer coating to the foam cushion may take place in a number of ways. For example, the friction-reducing interlayer could be sprayed onto the foam cushion. Another method of application is to introduce a slip-producing material of limited compatibility with the material with which the foam is formed, which slip-producing material will migrate to the surface of the foam and provide the desirable decrease in adherence of the foam cushion to the upholstery cover.

I claim:

1. An upholstered seating unit *including a frame* for use in furniture and the like comprising a resilient padding, a preformed upholstery cover over said resilient padding, a sheet of slippery material between said padding and cover to reduce friction between it and the cover to a minimum, and *means fastening said upholstery cover with respect to said frame and compressing said resilent padding via said upholstery cover and said sheet of slippery material so that said padding is held in depressed position by said fastening means;* said upholstery cover *at least at the seat portion* being free to move with respect to said slippery sheet due to its smooth surface whereby to facilitate the initial application of the upholstery cover by sliding it over the slippery sheet and padding and preventing wrinkling of the upholstery cover on the seating unit during use *and to enable said depressed padding to rebound to the limit allowed by said fastening means.*

2. An upholstered seating unit as defined in claim 1 wherein said slippery material is a plastic film.

3. An upholstered seating unit in accordance with claim 1 in which the resilient padding is polyurethane foam, and the sheet of slippery material is polyethylene film.

References Cited

The following references, cited by the Examiner, are of record in the patented file of this patent or the original patent.

UNITED STATES PATENTS

| | | | |
|---|---|---|---|
| 2,238,550 | 4/1941 | Blake et al. | 5—356 |
| 2,365,159 | 12/1944 | Walton et al. | 229—14 |
| 2,616,486 | 11/1952 | Hawley | 5—361 |
| 2,802,297 | 8/1957 | Meyer | 5—356 |
| 2,815,515 | 12/1957 | McKinley | 5—361 |
| 2,989,112 | 6/1961 | Sonnleitner | 154—41 |
| 3,083,056 | 3/1963 | Ward | 297—452 |
| 3,103,082 | 9/1963 | Baermann | 5—356 |
| 3,161,436 | 12/1964 | Hood | 297—460 |
| 3,173,159 | 3/1965 | Hart | 5—351 |
| 3,175,863 | 3/1965 | Hood | 297—455 |
| 3,180,681 | 4/1965 | Buralli | 297—377 |
| 3,238,599 | 3/1966 | Bauman | 29—91.1 |

FOREIGN PATENTS

| | | | |
|---|---|---|---|
| 864,301 | 1/1959 | Great Britain | 5—361 |

CASMIR A. NUNBERG, Primary Examiner

U.S. Cl. X.R.

5—356; 297—455